United States Patent
Bugdayci et al.

(10) Patent No.: US 11,740,989 B2
(45) Date of Patent: Aug. 29, 2023

(54) GENERATING PERFORMANCE METRICS FROM EVENTS DERIVED FROM USER INTERFACE LOGS

(71) Applicant: Salesforce, Inc., San Francisco, CA (US)

(72) Inventors: Ahmet Bugdayci, Los Altos, CA (US); Mario Sergio Rodriguez, Santa Clara, CA (US); Ivan Koval, Grenoble (FR); Linda Wei, San Francisco, CA (US); Sahibdeep Singh, San Francisco, CA (US); Marc Brette, Montbonnot-Saint-Martin (FR)

(73) Assignee: Salesforce, Inc., San Francisco, CA (US)

(*) Notice: Subject to any disclaimer, the term of this patent is extended or adjusted under 35 U.S.C. 154(b) by 58 days.

(21) Appl. No.: 17/155,676

(22) Filed: Jan. 22, 2021

(65) Prior Publication Data
US 2022/0237096 A1  Jul. 28, 2022

(51) Int. Cl.
*G06F 11/34* (2006.01)
*G06F 11/30* (2006.01)

(52) U.S. Cl.
CPC ...... *G06F 11/3082* (2013.01); *G06F 11/3438* (2013.01); *G06F 11/3476* (2013.01); *G06F 2201/86* (2013.01)

(58) Field of Classification Search
CPC ............. G06F 11/3082; G06F 11/3438; G06F 11/3476; G06F 2201/86
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |

(Continued)

OTHER PUBLICATIONS

Office Action dated Mar. 3, 2022 for U.S. Appl. No. 17/155,670 (pp. 1-7).

(Continued)

*Primary Examiner* — Mischita L Henson
(74) *Attorney, Agent, or Firm* — Kwan & Olynick LLP (57) ABSTRACT

System and methods are described for parsing log data items to find events in the log data items, wherein an event comprises at least a portion of a log data item matching an event definition; aggregating a plurality of performance metric definitions into a single expression; and generating a plurality of performance metrics from the events by applying the single expression to the events.

14 Claims, 7 Drawing Sheets

(56) References Cited

U.S. PATENT DOCUMENTS

| | | | |
|---|---|---|---|
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 9,697,316 B1 | 7/2017 | Taylor |
| 11,089,108 B2 | 8/2021 | Shah |
| 11,226,964 B1 | 1/2022 | Cairney |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0288414 A1 | 12/2007 | Barajas |
| 2009/0177744 A1 | 7/2009 | Marlow et al. |
| 2010/0017262 A1 | 1/2010 | Iyer |
| 2010/0257167 A1 | 10/2010 | Liu |
| 2011/0066615 A1 | 3/2011 | Pradhan |
| 2015/0294256 A1* | 10/2015 | Mahesh ............... G06Q 10/067 |
| | | 705/7.39 |
| 2018/0300296 A1 | 10/2018 | Ziraknejad |
| 2019/0188288 A1* | 6/2019 | Holm .................... G06F 16/289 |
| 2020/0394199 A1 | 12/2020 | Haldar |
| 2021/0098099 A1 | 4/2021 | Neumann |
| 2021/0365643 A1 | 11/2021 | Agrawal |
| 2022/0237101 A1* | 7/2022 | Singh .................. G06F 11/3438 |
| 2022/0237102 A1* | 7/2022 | Bugdayci ............ G06F 11/3495 |

OTHER PUBLICATIONS

Office Action dated Apr. 8, 2022 for U.S. Appl. No. 17/155,810 (pp. 1-28).

Notice of Allowance dated May 12, 2022 for U.S. Appl. No. 17/155,670 (pp. 1-5).

Office Action (Final Rejection) dated Jul. 29, 2022 for U.S. Appl. No. 17/155,810 (pp. 1-22).

Guttenberg, Nicholas, et al. "Permutation-equivariant neural networks applied to dynamics prediction." (Year: 2016).

Liang Pang et al. 2020. SetRank: Learning a Permutation-Invariant Ranking Model for Information Retrieval. In Proceedings of the 43rd International ACM SIGIR Conference on Research and Development in Information Retrieval (SIGIR '20). Association for Computing Machinery, New York, Ny, USA, 499-508. (Year: 2020).

Office Action (Non-Final Rejection) dated Aug. 24, 2022 for U.S. Appl. No. 17/162,859 (pp. 1-14).

Office Action (Notice of Allowance and Fees Due (PTOL-85)) dated Jan. 6, 2023 for U.S. Appl. No. 17/155,810 (pp. 1-10).

Qingyao Ai et al. 2019. Learning Groupwise Multivariate Scoring Functions Using Deep Neural Networks. In Proceedings of the 2019 ACM SIGIR International Conference on Theory of Information Retrieval (ICTIR '19). Association for Computing Machinery, New York, NY, USA, 85-92. (Year: 2019).

Office Action (Final Rejection) dated Mar. 13, 2023 for U.S. Appl. No. 17/162,859 (pp. 1-13).

* cited by examiner

FIG. 6B

GENERATING PERFORMANCE METRICS FROM EVENTS DERIVED FROM USER INTERFACE LOGS

TECHNICAL FIELD

One or more implementations relate to cloud computing environments, and more specifically to generating performance metrics from events derived from user interface logs of applications in a distributed system of a cloud computing environment.

BACKGROUND

"Cloud computing" services provide shared resources, software, and information to computer systems and other devices upon request or on demand. Cloud computing typically involves the over-the-Internet provision of dynamically scalable and often virtualized resources. Technological details can be abstracted from end-users, who no longer have need for expertise in, or control over, the technology infrastructure "in the cloud" that supports them. In cloud computing environments, software applications can be accessible over the Internet rather than installed locally on personal or in-house computer systems. Some of the applications or on-demand services provided to end-users can include the ability for a user to create, view, modify, store and share documents and other files.

In some situations, it may be desirable to measure the performance of these cloud computing services Measuring performance typically involves processing of a large data set. Determining performance metrics by accessing the large data set may be computationally expensive and may involve processing of the entire data set. As a result, the bigger the data set, the more expensive is the computation. When numbers of performance metrics being generated increases, the data set typically needs to be consumed multiple times. This results in a decrease in performance metric measurement efficiency.

BRIEF DESCRIPTION OF THE DRAWINGS

The included drawings are for illustrative purposes and serve to provide examples of possible structures and operations for the disclosed inventive systems, apparatus, methods, and computer-readable storage media. These drawings in no way limit any changes in form and detail that may be made by one skilled in the art without departing from the spirit and scope of the disclosed implementations.

DETAILED DESCRIPTION

Embodiments of the present invention provide a data processing pipeline using a modular representation of raw log data and generating one or more performance metrics based at least in part on the raw log data in an efficient and reproducible way. In one embodiment, the source of the raw log data is obtained from observing user interactions or user performance from a user interface of an application in a cloud computing environment. Some types of performance metrics are search relevance metrics (e.g., click through rate (CTR) for search results, etc.), however, embodiments may be generalized to other application domains.

In one example domain, performance metrics are generated to measure the utilization of a search feature in an application program by analyzing the log data of the application program. Such analysis requires multiple different aggregation metrics on the log data, and the log data is typically very large, due to the fact of the scale of the use of the application program by many users in the cloud computing environment (e.g., the system supports multitenancy, includes thousands of organizations, millions of users (perhaps even tens of millions of users)). Generating metrics from aggregation over an extremely large structured data set (whether grouped or not) is an expensive computational operation as the processing usually requires consuming the entire data set in multiple passes. As a result, the bigger the dataset, the more expensive is the computation. When the number of metrics increases, the data needs to be consumed multiple times. This leads to two types or problems: performance will decrease if the data needs to be consumed multiple times, and as the system evolves with additional metrics, the complexity of the aggregation of the metrics increases for each additional metric added to the system.

Embodiments of the present invention solves both problems as the performance metrics generator system as described herein allows the computation of an arbitrary number of aggregated metrics without hindering the ability of the system to accept new metrics definitions while consuming the log data only once (e.g., taking only a single pass through the data set). As a result, embodiments provide for the generation of metrics to scale efficiently, as adding new metrics is as simple as adding an aggregation expression to the defined list of metrics. Finally, the output data of embodiments of the present invention has a fixed format such that adding new performance metric definitions does not result in a modification of the schema of the output data.

Figure 1:
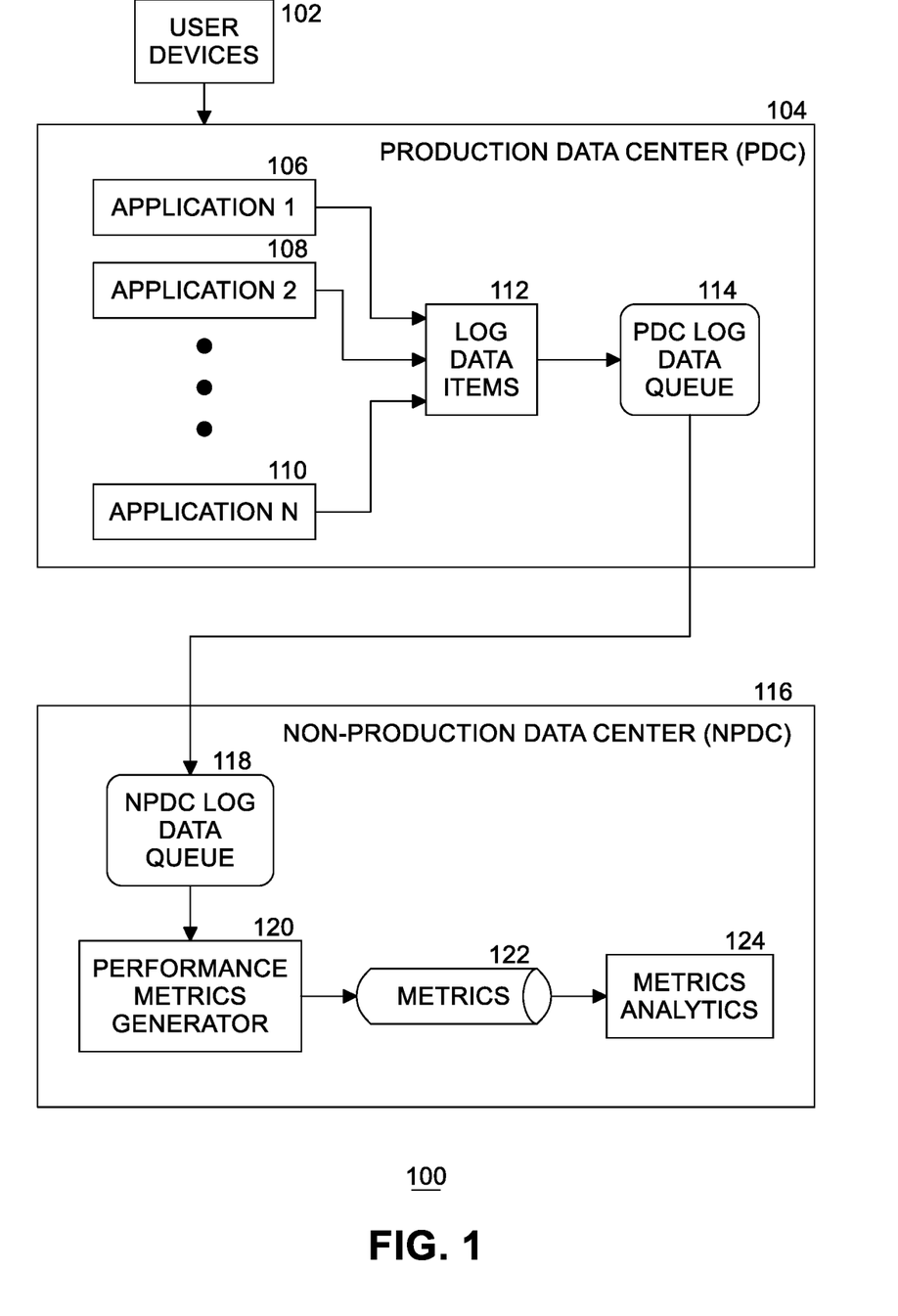
FIG. 1 illustrates an example computing environment according to some embodiments.

FIG. 1 illustrates an example computing environment 100 according to some embodiments. At least one production data center (PDC) 104 in a cloud computing environment comprises a plurality of conventional computer servers, storage devices, and network interfaces (not shown) to run computer applications for users. Users interact with user devices 102 to access the applications running in the PDC over one or more computer or communications networks. Examples of user devices include laptop and desktop personal computers, smart phones, tablet computers, personal digital assistants (PDAs), smart home appliances, home networking equipment, and so on. PDC 104 runs a plurality of applications 1 106, 2 108, . . . N 110, where N is a natural number. In some situations, N may be very large—millions or even tens of millions of instances of applications being accessed by millions or tens of millions of users worldwide. In some scenarios, PDC 104 is operated by a cloud service provider (CSP) and comprises a plurality of production data centers distributed in sites throughout the world. In some embodiments, there are multiple PDCs.

In order to measure the performance of applications 106, 108, . . . 110, data is collected from the applications. In one embodiment, applications 106, 108, . . . 110 are instrumented by application developers to provide log data items 112. Log data items 112 comprise any information relating to the applications that can be measured to assess system performance of PDC 104 and/or the applications. For example, when an application, such as application 2 108, is a search application, log data items 112 may include user typing actions (entering text using a physical or virtual keyboard, for example), mouse selections (e.g., clicks), mouse hovers, search terms, hyperlink selections (clicks), etc. Each log data item 112 may include a plurality of fields such as log type, attributes, time stamp, etc. In some embodiments, the format of each log data item is a "free form" text as determined by the developer of the application generating the log data item. In some embodiments, there is no universal format of the log data items, and they may be in any format. There may be any number of log data items 112 generated by applications over a selected period of time. In some scenarios, the number of log data items generated may be extremely large, perhaps in the millions, tens of millions, hundreds of millions, or even billions of log data items in a plurality of PDCs over a selected period of time (which may be a minute, an hour, a day, a week, a month, a quarter, a year, etc.).

As log data items 112 are generated by the applications, the log data items are inserted into at least one PDC log data queue 114. In one embodiment, the at least one PDC log data queue 114 is implemented as a Kafka® message queue available from the Apache® Software Foundation at kafka.apache.org, although other message queues may also be used. Apache Kafka® is an open-source stream-processing software platform developed by the Apache® Software Foundation, written in Scala and Java. The Kafka®project aims to provide a unified, high-throughput, low-latency platform for handling real-time data feeds.

At least one non-production data center (NPDC) 116 communicates with PDC 104 to read log data items 112 from the at least one PDC log data queue 114. Log data items 112 obtained from the at least one PDC log data queue 114 of PDC 104 are stored in NPDC log data queue 118 in NPDC 116. In one embodiment, NPDC log data queue 118 is also a Kafka® message queue, although other message queues may also be used. In an embodiment, NPDC 116 is situated at a different location than the at least one PDC 104. In another embodiment, NPDC 116 is situated at the same location as at least one of the PDCs 104. In an embodiment, NPDC 116 does not run applications for access by user devices 102, but instead runs applications and/or tools for research and development activities, data center monitoring activities, and so on.

Performance metrics generator 120 reads log data items from NPDC log data queue 118 and generates metrics 122 representing measurements of the performance of applications by PDC 104. Metrics 122 may be input to metrics analytics 124. Metrics analytics 124 uses metrics 122 to present information to systems administrators of NPDC 116 and/or PDC 104 to allow the systems administrators to manage PDC 104 to provide better service to user devices 102. In an embodiment, metrics analytics 124 includes a visual dashboard capability representing current operating attributes of PDC 104. In an embodiment, metrics analytics 124 includes machine learning (ML) processes to analyze metrics 122 to improve cloud computing services to user devices 102. In an embodiment, metrics analytics 124 automatically communicates with PDC 104 to instruct the PDC to change one or more operating characteristics of the PDC based on metrics 122. In some embodiments, metrics analytics 124 is replaced by any program for analyzing and/or interpreting metrics 122.

Figure 2:
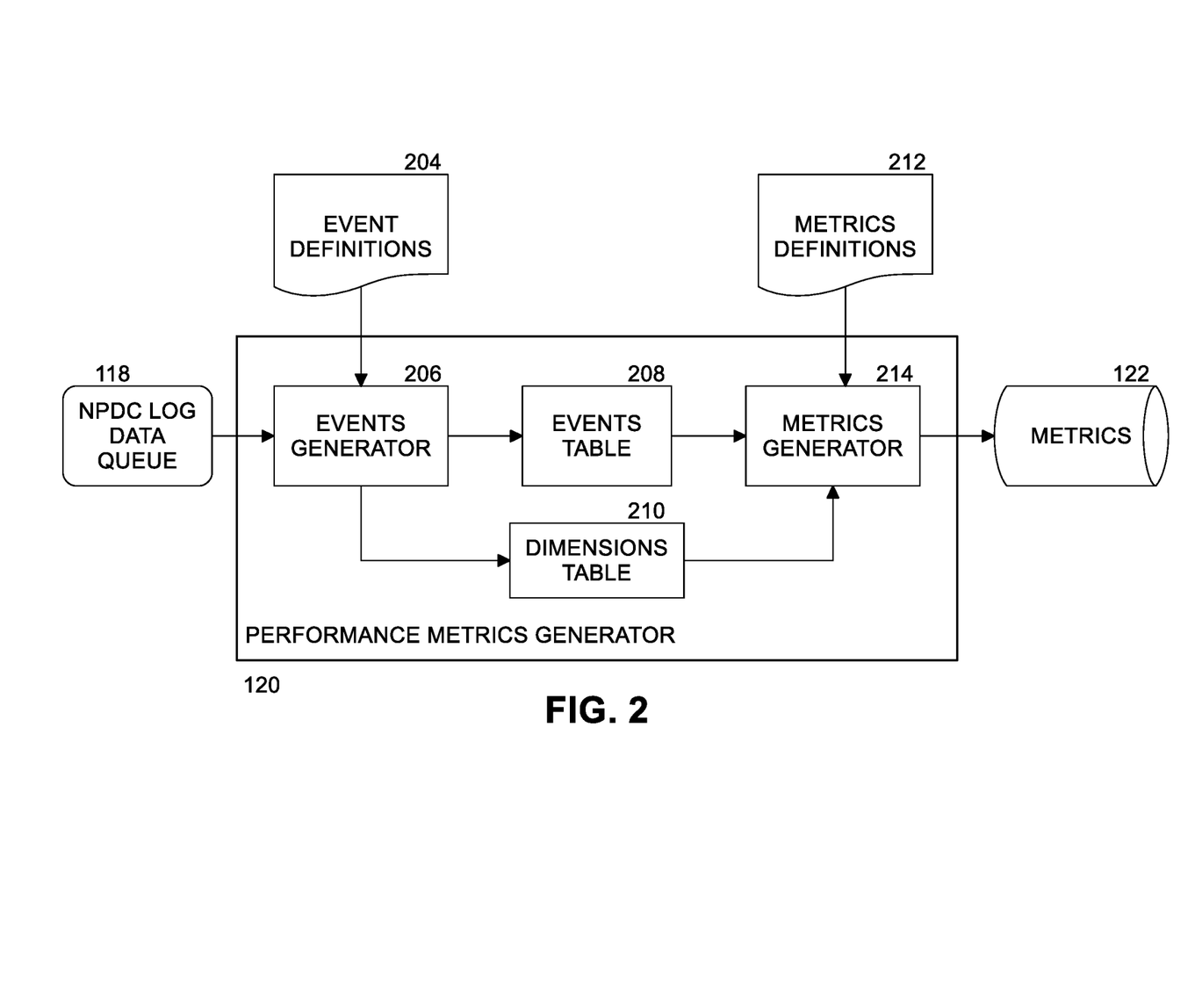
FIG. 2 is a diagram of a performance metric generator according to some embodiments.

FIG. 2 is a diagram of performance metrics generator 120 according to some embodiments. Performance metrics generator 120 reads log data items 112 from NPDC log data queue 118, analyzes the log data items by events generator 206 using event definitions 204 to generate events stored in an events table 208 and dimensions stored in dimensions table 210, and analyzes the events and dimensions using metrics definitions 212 by metrics generator 214 to generate metrics 122. As used herein, a dimension is an attribute which may be used to filter events. Examples of dimensions include customer ID (e.g., organization), version number, release number, metric time span (e.g., daily, weekly, monthly, etc.), computing platform, customer group, customer division, customer department, geographic location, IP address, and so on.

Figure 3:
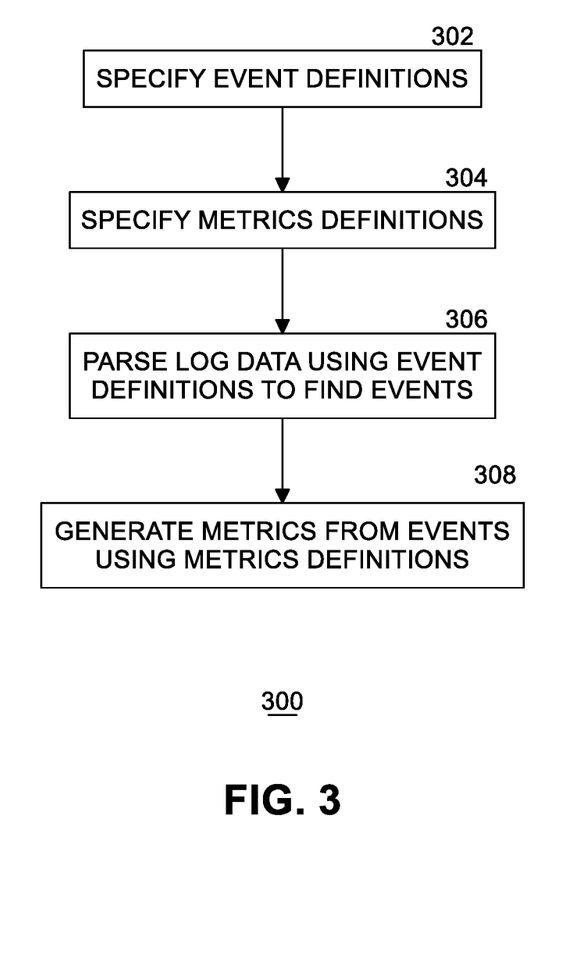
FIG. 3 is a flow diagram of generating performance metrics from log data items according to some embodiments.

FIG. 3 is a flow diagram 300 of generating performance metrics from log data items 112 according to some embodiments. At block 302, event definitions 204 are specified and/or updated prior to operating events generator 206 of performance metrics generator 120. At block 304, metrics definitions 212 are specified and/or updated prior to operating metrics generator 214 of performance metrics generator 200. At block 306, events generator 206 parses log data items 112 from NPDC log data queue 118 using event definitions 204 to find events (and associated dimensions). Events are stored in events table 208 and dimensions are stored in dimensions table 210. A block 308, metrics generator 214 generates metrics 122 as defined by metrics definitions 212 from analysis of events in events table 208 and dimensions in dimensions table 210.

In one embodiment, performance metrics generator 120 parses log data items to find events in the log data items, wherein an event comprises at least a portion of a selected log data item matching an event definition; aggregates a plurality of performance metric definitions into a single expression; and generates a plurality of performance metrics from the events, in one pass through the events, by applying the single expression to the events.

Log data items 112 are "raw" (e.g., unprocessed) data that have been created by monitoring usage of application programs 1 106, 2 108, . . . N 110 by user devices 102 in PDCs 104 of the cloud computing environment. As users interact with an application program information, that interaction is stored in log data items 112. Log data may contain many different fields. For example, for user interface (UI) logs, different combinations of various fields describe different UI events which have occurred as the user interacts with the application program. One simple example of raw log data items for a sequence of UI actions taken by the user in just a few seconds is as follows:

1. Open application program. 2. Click on search box. 3. Type character "m". 4. Type character "a". 5. Type character "r". 6. Hover mouse over first item. 7. Type "io" quickly. 8. Select "enter". 9. Click on the third result in a displayed list.

Each row of a log data item includes a plurality of fields. In one example, a row may include:

| | |
|---|---|
| Pod | string |
| OrganizationID | string |
| UserID | string |
| Release | string |
| Gen_Date | string |
| Datacenter | string |
| SourceFile | string |
| DynamicFields | map<string, string> |
| TS_Date | string |
| LogRecordType | string |

Log data items 112 may record the UI actions of perhaps millions of users of an application program over a selected period of time (e.g., an hour, a day, a week, a month, etc.). Thus, in some examples log data items 112 may comprise a very large data set (e.g., including millions of rows of log data totaling perhaps petabytes of data). Log data items 112 is considered to be "raw" in the sense that the data has not yet been processed by performance metrics generator 120.

Using event definitions 204 created by a system administrator, events generator 206 of performance metrics generator 200 reads the log data items 112 and generates events from the log data items. Events represent actions that have been performed on an UI element in the application program. For example, if the user clicked on a search box of a UI, this may result in a "search activation" event. If the user typed in a character into the search box, this may result in a "search dialog list impression event." If the user hovered the mouse over a UI box, this may result in a "search dialog list item click" event. A sequence of events represents a course of action taken by a user in interacting with the UI. In embodiments, the type, number, and timing of the events may be analyzed to generate performance metrics 122. The number of events generated from a very large number of log data items 112 may also be very large (e.g., possibly millions or tens of millions of events over a selected period of time).

Event definitions 204 are created and/or updated by a system administrator. In an embodiment, event definitions 204 are stored in a file. The file may include an array or list of event definitions. In one embodiment, events are defined in a JavaScript Object Notation (JSON) format. In an embodiment, an event definition includes an array of selectors. In one embodiment, an event definition includes an event name, a computing platform of the UI which performed the event, one or more selectors which include a list of fields from a log data item 112 and the expected values for a row of the log data item to be classified as this event, a list of fields that must not be null in the log data row, and a list of fields that should be null in the log data row. In other embodiments, other components of an event definition may be specified.

Here is an example of event definitions 204 which includes the definition of two different sample UI events.

```
[
{
"event": "search_initiation_event",
"platform": "ES",
"selectors": {
"payload_eventSource": "synthetic-click",
"payload_locator_scope": "search-assistant-desktop"
"payload_locator_target": "search-input"
}
"not_null_fields": ["payload_attributes_searchDialogSessionId"],
"null_fields": [ ]
}
{
"event": "instant_dialog_imp",
"platform": "ES",
"selectors": {
"payload_eventSource": "synthetic-refresh",
"payload_locator_scope": "search-assistant-desktop",
"payload_locator_target": "search-suggestions-list"
}
"not_null_fields": ["payload_attributes_searchDialogSessionId",
"payload_attributes_instantResultListImpressionId"],
"null_fields": [ ]
}
]
```

Event definitions 204 are used by events generator 206 to generate events from the log data items by comparing each row of log data items 112 to the event definitions to check whether a row corresponds to an event definition. When the row of the log data items corresponds to an event definition, event generator 206 outputs an event to events table 208. In an embodiment, events generator 206 treats each field of the log data item as a string field. This allows applications to specify selectors using regular expressions.

In one example, processing of the simple example of the raw log data item shown above may result in the following events being generated by events generator 206.

1. Search activation event. 2. Search dialog list impression event. 3. Search dialog list impression event. 4. Search dialog list impression event. 5. Search dialog list impression event. 6. Search dialog list impression event. 7. Record preview event. 8. Full search results page impression event. 9. Full search result click event.

An example of an event stored in events table 208 is shown below. In this example, the event is a "search dialog list impression event." Each event includes one or more fields as specified by event definitions 204.

```
Event-type: Search Dialog List Impression Event
SearchDialogSessionId: "f73f1c0f-aa90-ea53"
SearchImpressionListId: "f73f1c0f-aa90-ea53_1"
Timestamp: 1580429020
Userid: 0050M00000D0Xx1
Pod: na44
OrgId: 00D00000000062
Release: 224
Platform: SFX
Sub-platform: SFX-ES
ResultSet: [
  {
  RecordId: 123
  Position: 1
  ResultType: TypeAhead
  }
  {...}
]
```

Figure 4:
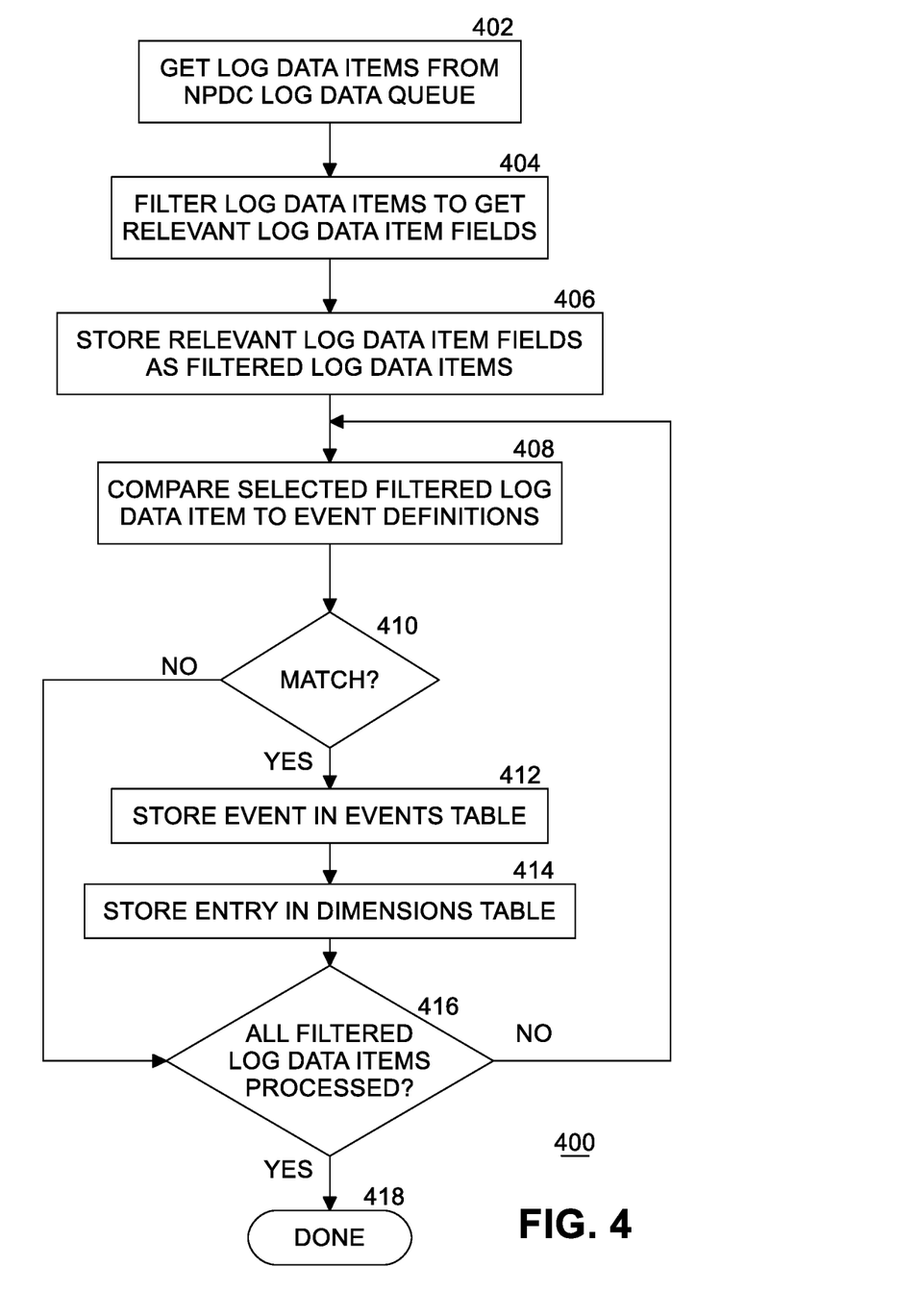
FIG. 4 is a flow diagram of events generator processing according to some embodiments.

FIG. 4 is a flow diagram of events generator processing 400 according to some embodiments. At block 402, events generator 206 gets log data items 112 from NPDC log data queue 118. At block 404, events generator 206 filters the log data items to get relevant log data item fields. Fields that are irrelevant are omitted from further processing. At block 406, events generator 206 internally stores the relevant log data items as filtered log data items. At block 408, events generator 206 selects a first filtered log data item and compares the selected filtered log data item to the definitions in event definitions 204. If the selected filtered log data item matches one of the event definitions, then the matched event for the selected log data item is stored in events table 208. At block 414, if any attribute of the matched event is not yet in dimensions table 210, then events generator 206 creates an entry in dimensions table 210 for the newfound attribute. In an embodiment, examples of dimensions (e.g., an attributes) include information such as customer name, address, city, state, zip code, area code, phone number, username, customer organization ID, customer group, customer division, customer department, IP address, time of the event, and so on. In one embodiment, dimensions are relatively static information items that may be used to filter events.

At block 416, events generator 206 determines if all filtered log data items have been processed. If not, events generator 206 selects another filtered log data item and processing continues with block 408. If all filtered log data items have been processed, then event generator processing ends at block 418. At this point, all possible events have been generated for the current batch of log data items 112. Events generation processing may be repeated with more batches of log data items as needed (e.g., every 15 minutes, every 30 minutes, hourly, every two hours, every four hours, daily, etc.). In one embodiment, each row of events table 208 represents an event, and each column represents whether the event is present (e.g., either a 0 for no or a 1 for yes) in the filtered log data items.

Metrics definitions 212 are created and/or updated by a system administrator. In an embodiment, metrics definitions 212 are stored in a file. Metrics definitions are similar to a query language where embodiments use events as components and apply one or more mathematical operations or other defined functions (e.g., percentile, quantile calculations, etc.) to generate a resulting performance metric 122 for any desired combination of identified index fields. The metrics therefore are easier to generate and display. In an embodiment, each metric definition includes class fields of name, platforms, numerator, and denominator. In an embodiment, each metric is defined by a name and up to M (where M is a natural number) simple aggregation expressions (e.g., a combination of aggregation expressions such as average, maximum, minimum, etc . . . ).

In one embodiment, a metrics definition may include for each metric, specifying percentiles, the type of metric, which rows (e.g., events) in events table 208 should be selected to compute the metric, which column should be used for metrics computation, and the aggregation functions used.

Here is a portion of an example metrics definitions 212 which includes the definition of three different metrics.

Val clickbait: Metric={New Metric {"CQ_CTR", Seq("ES"), castAndSum(col("cq_clk")), castAndSum(col("cq_imp")))}

Val cqZrr: Metric={New Metric{"CQ_Zero_Result Rate", Seq("ES"), castAndSum(col("cq_imp_no_results")), castAndSum(col("cq_imp")))}

Val deflectionClickRate: Metric={New Metric {"Deflection_Rate", Seq("LEX", "ES"), castAndSum(col("ta_clk")||col("ta_preview_clk")||col("mru_clk")||col("lv_clk")), castAndSum(col("search_initiation_event"")))}

An example of a portion of metrics definitions 212 file is shown in Table 1.

TABLE 1

| Metric Name | Long Metric Name | Numerator | Denominator |
| --- | --- | --- | --- |
| CQ_CTR | Conceptual Query Click Through Rate | Count of click events on conceptual query results page | Count of conceptual query result page impression events |
| Recommended_Result CTR | Recommended Result Click Through Rate | Count of recommended result click events | Count of search result page impression events |
| Deflection_Rate | Deflection Rate | Count of deflection click events | Count of search activation events |
| ListView_IR_Click_Rate | Deflection Rate Component - Listview CTR | Count of listview click events | Count of instant search dialog list impression events that have a listview item |
| OER | Overall Engagement Rate | Count of search activation events resulting in a least one click event | Count of search activation events |
| SERP_Rate | Keyword full search rate | Count of full search result impression events | Count of search activation events |
| SERP_CTR | Keyword full search page CTR | Count of full search result impression events resulting in at least one click event | Count of full search result impression events |
| Zero_Result_Rate | Keyword full search zero result rate | Count of full search result impression events with no results | Count of search activation events |

In an embodiment, metrics generator 214 provides at least the following advantages. Metrics can be versioned, defined without analyzing the log data items 112, and reused without performing data cleanup or pre-processing based on the user. New metrics can be easily added by inserting a new definition into the metrics definition 212 file. The metrics generator function 214 does not change depending on the contents of the metrics definitions file 212. Embodiments can generate metrics on different dimensions (e.g., attributes for each organization of users as well across all organizations). Embodiments can generate metrics for different time periods (e.g., day/week/month, etc.) and on historical data. Finally, embodiments provide efficient computation of metrics with a single pass aggregation of metrics, instead of repeatedly loading a set of data for a metric, computing the metric, and then reloading another set of a data for the next metric, computing the next metric, and so on.

In one embodiment, metrics generator 214 abstracts out the complexity of combining aggregation expressions so the performance metrics generator system 120 can be enhanced with new aggregation metrics while keeping the single pass computation advantage.

In one embodiment, metrics generator 214 uses Spark™ Structured Query Language (SQL) available from the Apache Software Foundation to consume, group and aggregate over the event data. In one embodiment, the aggregation combination relies on the MapType datatype column of Apache Spark™ SQL.

In an embodiment, metrics generator 214 performs the following actions. First, metrics generator 214 obtains definitions of the metrics to be computed from metrics definitions 212. In one embodiment, metrics definitions 212 is a text file containing mappings of metric names to metric aggregation expressions. Next, metrics generator 214 loads the events data from events table 208 and declares the desired groupings of the events data.

Metrics generator 214 automatically combines the metrics into a single complex aggregation expression:

{(metric1.name)->[metric1.expr1, metric
1.expr2, . . . , metric1.exprM], . . . , (metricN.
name)->[metric1.expr1, metric1.expr2, . . . ,
metric1.exprM]}

This action instructs Apache Spark to aggregate all the expressions and store the intermediate results in a map indexed by the metrics names. Metrics generator 214 then performs the aggregation (e.g., reduce) operation. This results in one or more (depending on the groupings) "super rows". Each super row contains all the information about the grouping of the aggregation, and one column containing a mapping between each metric name and the values of the aggregation for each expression. Each super row is exploded into as many rows as there are metrics. Each row has the same format (metric name, metric value1, metric value2, . . . metric value M). Metrics generator 214 then stores the rows (metrics).

In one example, an aggregated metric may be represented as follows:

| Pod | string |
| OrganizationID | string |
| Release | string |
| Platform | string |
| Metric_Name | string |
| Metric_Numerator | int |
| Metric_Denominator | int |
| Metric_Value | double |
| TS_Date | string |
| Date_Range | string |

Figure 5:
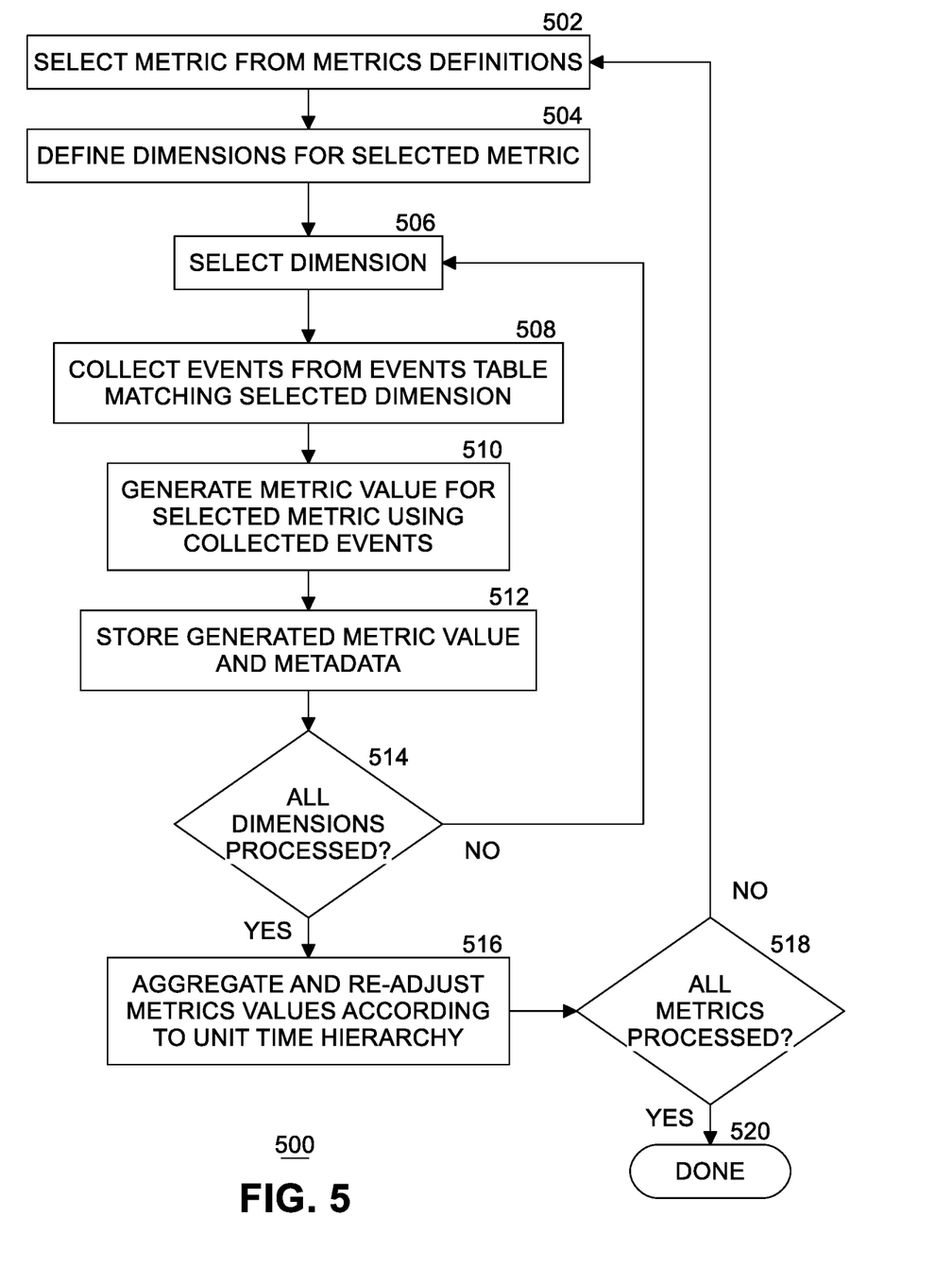
FIG. 5 is a flow diagram of metrics generator processing according to some embodiments.

FIG. 5 is a flow diagram of metrics generator processing 500 according to some embodiments. At block 502, metrics generator 214 selects a metric to generate from metrics definitions 212. At block 504, metrics generator 214 defines dimensions (e.g., attributes with which to filter events) for the selected metric. At block 506, metrics generator 214 selects a dimension for the current metric. At block 508, metrics generator 214 collects events from events table 208 with an attribute matching the current selected dimension. At block 510, metrics generator 214 generates a metric value for the selected metric using the collected events. At block 512, metrics generator stores the generated metric value and associated components of the metrics formulas in metrics 122. At block 514, if all desired dimensions (e.g., attributes) have not been processed for this metric, then processing continues with selection of another dimension from dimensions table 210 at block 506. Otherwise, processing continues with block 516, where metrics generator 214 aggregates and re-adjusts a plurality of metric values according to a unit time hierarchy. In one embodiment, a unit time hierarchy refers to a period of time over which the metrics are generated (e.g., weekly—the previous 7 one day windows, monthly—previous 30 one day windows, by calendar month, by calendar quarter, previous 365 days, year to date, etc.).

At block 518, metrics generator 214 determines if all metrics from metrics definitions 212 have been processed for this batch of events in events table 208. If not, metrics generator selects another metric to process at block 502. Otherwise, metrics generator processing is done for this batch at block 520. These steps may be repeated for additional batches.

Thus, metrics 122 are generated from events in events table 208 based at least in part on metrics definitions 212.

Example Electronic Devices and Environments. One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, computer server, cloud computing server, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 6A:
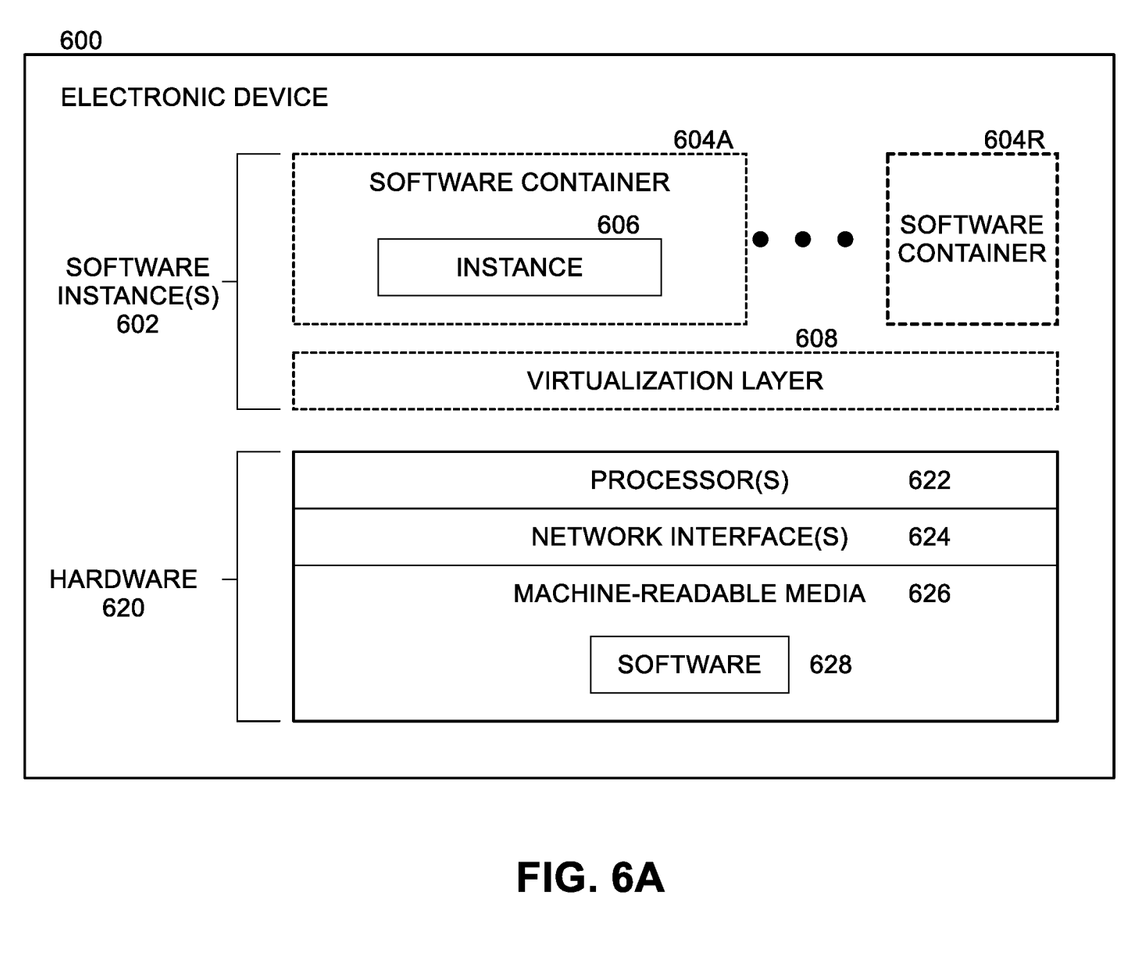
FIG. 6A is a block diagram illustrating an electronic device according to some example implementations.

FIG. 6A is a block diagram illustrating an electronic device 600 according to some example implementations. FIG. 6A includes hardware 620 comprising a set of one or more processor(s) 622, a set of one or more network interfaces 624 (wireless and/or wired), and machine-readable media 626 having stored therein software 628 (which includes instructions executable by the set of one or more processor(s) 622). The machine-readable media 626 may include non-transitory and/or transitory machine-readable media. Performance metrics generator system 120 may be implemented in one or more electronic devices 600. In one implementation: 1) each of the clients is implemented in a separate one of the electronic devices 600 (e.g., in end user devices where the software 628 represents the software to implement clients to interface directly and/or indirectly with the performance metrics generator system 120 (e.g., software 628 represents a web browser, a native client, a portal, a command-line interface, and/or an application programming interface (API) based upon protocols such as Simple Object Access Protocol (SOAP), Representational State Transfer (REST), etc.)); 2) the performance metrics generator system 120 is implemented in a separate set of one or more of the electronic devices 600 (e.g., a set of one or more server devices where the software 628 represents the software to implement the performance metrics generator system 100); and 3) in operation, the electronic devices implementing the performance metrics generator system 120 would be communicatively coupled (e.g., by a network) and would establish between them (or through one or more other layers and/or or other services) connections for submitting UI interactions log data to the performance metrics generator system 100 and sending metrics 122 to metrics analytics 124. Other configurations of electronic devices may be used in other implementations (e.g., an implementation in which the client and the performance metrics generator system 200 are implemented on a single one of electronic device 600).

During operation, an instance of the software 628 (illustrated as instance 606 and referred to as a software instance; and in the more specific case of an application, as an application instance) is executed. In electronic devices that use compute virtualization, the set of one or more processor(s) 622 typically execute software to instantiate a virtualization layer 608 and one or more software container(s) 604A-604R (e.g., with operating system-level virtualization, the virtualization layer 608 may represent a container engine (such as Docker Engine by Docker, Inc. or rkt in Container Linux by Red Hat, Inc.) running on top of (or integrated into) an operating system, and it allows for the creation of multiple software containers 604A604R (representing separate user space instances and also called virtualization engines, virtual private servers, or jails) that may each be used to execute a set of one or more applications; with full virtualization, the virtualization layer 608 represents a hypervisor (sometimes referred to as a virtual machine monitor (VMM)) or a hypervisor executing on top of a host operating system, and the software containers 604A-604R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 628 is executed within the software container 604A on the virtualization layer 608. In electronic devices where compute virtualization is not used, the instance 606 on top of a host operating system is executed on the "bare metal" electronic device 600. The instantiation of the instance 606, as well as the virtualization layer 608 and software containers 604A-604R if implemented, are collectively referred to as software instance(s) 602.

Alternative implementations of an electronic device may have numerous variations from that described above. For example, customized hardware and/or accelerators might also be used in an electronic device.

Figure 6B:
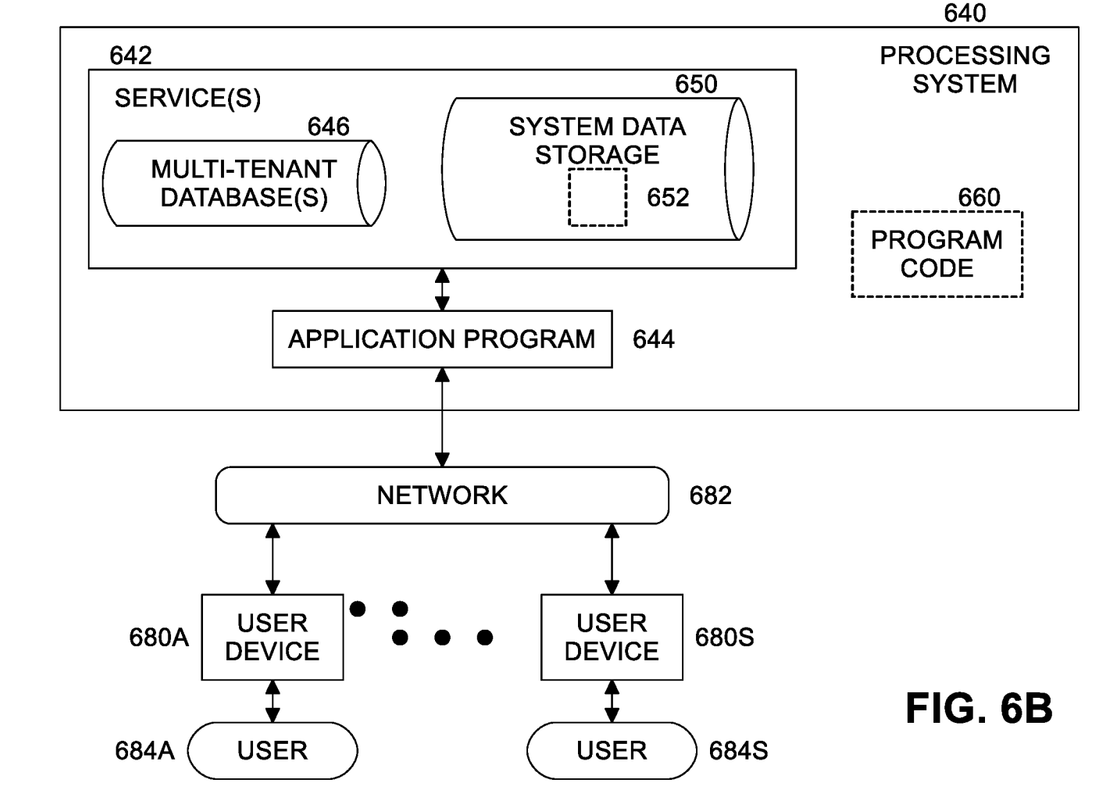
FIG. 6B is a block diagram of a deployment environment according to some example implementations.

Example Environment. FIG. 6B is a block diagram of a deployment environment according to some example implementations. A system 640 includes hardware (e.g., a set of one or more server devices) and software to provide service(s) 642, including the performance metrics generator system 100. In some implementations, the system 640 is in one or more datacenter(s). These datacenter(s) may be: 1) first party datacenter(s), which are datacenter(s) owned and/or operated by the same entity that provides and/or operates some or all of the software that provides the service(s) 642; and/or 2) third-party datacenter(s), which are datacenter(s) owned and/or operated by one or more different entities than the entity that provides the service(s) 642 (e.g., the different entities may host some or all of the software provided and/or operated by the entity that provides the service(s) 642). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 640 is coupled to user devices 680A-680S over a network 682. The service(s) 642 may be on-demand services that are made available to one or more of the users 684A-684S working for one or more entities other than the entity which owns and/or operates the on-demand services (those users sometimes referred to as outside users) so that those entities need not be concerned with building and/or maintaining a system, but instead may make use of the service(s) 642 when needed (e.g., when needed by the users 684A-684S). The service(s) 642 may communicate with each other and/or with one or more of the user devices 680A-680S via one or more APIs (e.g., a REST API). In some implementations, the user devices 680A-680S are operated by users 684A-684S, and each may be operated as a client device and/or a server device. In some implementations, one or more of the user devices 680A-680S are separate ones of the electronic device 600 or include one or more features of the electronic device 600. In some embodiments, service(s) 642 includes performance metrics generator system 100.

In some implementations, the system 640 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 640 is a multi-tenant cloud computing architecture supporting multiple services, such as one or more of the following types of services: schema inference and event validation processing, Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM).

For example, system 640 may include an application platform 644 that enables PAAS for creating, managing, and executing one or more applications developed by the provider of the application platform 644, users accessing the system 640 via one or more of user devices 680A-680S, or third-party application developers accessing the system 640 via one or more of user devices 680A-680S.

In some implementations, one or more of the service(s) 642 may use one or more multi-tenant databases 646, as well as system data storage 650 for system data 652 accessible to system 640. In certain implementations, the system 640 includes a set of one or more servers that are running on server electronic devices and that are configured to handle requests for any authorized user associated with any tenant (there is no server affinity for a user and/or tenant to a specific server). The user devices 680A-680S communicate with the server(s) of system 640 to request and update tenant-level data and system-level data hosted by system 640, and in response the system 640 (e.g., one or more servers in system 640) automatically may generate one or more Structured Query Language (SQL) statements (e.g., one or more SQL queries) that are designed to access the desired information from the multi-tenant database(s) 646 and/or system data storage 650.

In some implementations, the service(s) 642 are implemented using virtual applications dynamically created at run time responsive to queries from the user devices 680A-680S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 660 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 644 includes an application setup mechanism that supports application developers' creation and management of applications, which may be saved as metadata by save routines. Invocations to such applications, including the schema inference and event validation system 100, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 682 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols and may include one or more intermediary devices for routing data between the system 640 and the user devices 680A-680S.

Each user device 680A-680S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 640. For example, the user interface device can be used to access data and applications hosted by system 640, and to perform searches on stored data, and otherwise allow one or more of users 684A-684S to interact with various GUI pages that may be presented to the one or more of users 684A-684S. User devices 680A-680S might communicate with system 640 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 680A-680S might include an HTTP client, commonly referred to as a "browser," for sending and receiving HTTP messages to and from server(s) of system 640, thus allowing users 684A-684S of the user devices 680A-680S to access, process and view information, pages and applications available to it from system 640 over network 682.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

In the detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B, or C" is intended to include the possibilities of "A," "B," "C," "A and B," "B and C," "A and C," and "A, B, and C."

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

In addition, the articles "a" and "an" as used herein and in the appended claims should generally be construed to mean "one or more" unless specified otherwise or clear from context to be directed to a singular form. Reference throughout this specification to "an implementation," "one implementation," "some implementations," or "certain implementations" indicates that a particular feature, structure, or characteristic described in connection with the implementation is included in at least one implementation. Thus, the appearances of the phrase "an implementation," "one implementation," "some implementations," or "certain implementations" in various locations throughout this specification are not necessarily all referring to the same implementation.

Some portions of the detailed description may be presented in terms of algorithms and symbolic representations of operations on data bits within a computer memory. These algorithmic descriptions and representations are the manner used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "retrieving," "transmitting," "computing," "generating," "adding," "subtracting," "multiplying," "dividing," "optimizing," "calibrating," "detecting," "performing," "analyzing," "determining," "enabling," "identifying," "modifying," "transforming," "applying," "aggregating," "extracting," "registering," "querying," "populating," "hydrating," "updating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission, or display devices.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Any of the software components or functions described in this application can be implemented as software code to be executed by one or more processors using any suitable computer language such as, for example, C, C++, Java™, or Python using, for example, existing or object-oriented techniques. The software code can be stored as non-transitory instructions on any type of tangible computer-readable storage medium (referred to herein as a "non-transitory computer-readable storage medium"). Examples of suitable media include random access memory (RAM), read-only memory (ROM), magnetic media such as a hard-drive or a floppy disk, or an optical medium such as a compact disc (CD) or digital versatile disc (DVD), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system and may be among other computer-readable media within a system or network. A computer system, or other computing device, may include a monitor, printer, or other suitable display for providing any of the results mentioned herein to a user.

In the foregoing description, numerous details are set forth. It will be apparent, however, to one of ordinary skill in the art having the benefit of this disclosure, that the present disclosure may be practiced without these specific details. While specific implementations have been described herein, it should be understood that they have been presented by way of example only, and not limitation. The breadth and scope of the present application should not be limited by any of the implementations described herein but should be defined only in accordance with the following and later-submitted claims and their equivalents. Indeed, other various implementations of and modifications to the present disclosure, in addition to those described herein, will be apparent to those of ordinary skill in the art from the foregoing description and accompanying drawings. Thus, such other implementations and modifications are intended to fall within the scope of the present disclosure.

Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein, along with the full scope of equivalents to which such claims are entitled.

What is claimed is:

1. A Computer-implemented method comprising:
obtaining a plurality of log data items from a log data queue;
filtering the plurality of log data items to obtain relevant log data items;
comparing selected relevant log data items to one or more event definitions;
when a selected relevant log data item matches an event definition, storing an event in an events table and one or more dimensions of the event in a dimensions table, wherein an event comprises at least a portion of a log data item matching an event definition;
aggregating a plurality of performance metric definitions into a single expression;
selecting a metric from the plurality of performance metrics definitions;
selecting a dimension for the metric;
collecting events with an attribute matching the selected dimension;
generating a metric value for the selected metric using the collected events;
repeating the selecting the metric, selecting the dimension, collecting, and generating forall metrics from the plurality of performance metrics definitions;
aggregating the generated metric values according to a unit time hierarchy; and
changing one or more operating characteristics based on the aggregated generated metric values.

2. The computer-implemented method of claim 1, wherein the events represent user interactions with a user interface of an application.

3. The computer-implemented method of claim 1, wherein the plurality of performance metrics comprises search relevance metrics.

4. The computer-implemented method of claim 1, comprising updating the plurality of performance metric definitions by adding an aggregation expression to a list of performance metrics.

5. The computer-implemented method of claim 1, comprising updating the event definition by a system administrator prior to parsing the log data items.

6. The computer-implemented method of claim 1, further comprising analyzing the log data items and events to identify one or more dimensions of the events.

7. A tangible, non-transitory computer-readable storage medium having instructions stored thereon which, when executed by a processing device, cause the processing device to:
obtain a plurality of log data items from a log data queue;
filter the plurality of log data items to obtain relevant log data items;
compare selected relevant log data items to one or more event definitions;
when a selected relevant log data item matches an event definition, store an event in an events table and one or more dimensions of the event in a dimensions table, wherein an event comprises at least a portion of a log data item matching an event definition;
aggregate a plurality of performance metric definitions into a single expression;
select a metric from the plurality of performance metrics definitions;
select a dimension for the metric;
collect events with an attribute matching the selected dimension;
generate a metric value for the selected metric using the collected events;
repeat the selecting the metric, selecting the dimension, collecting, and generating forall metrics from the plurality of performance metrics definitions;
aggregate the generated metric values according to a unit time hierarchy; and
change one or more operating characteristics based on the aggregated generated metric values.

8. The tangible, non-transitory computer-readable storage medium of claim 7, wherein the events represent user interactions with a user interface of an application.

9. The tangible, non-transitory computer-readable storage medium of claim 7, wherein the plurality of performance metrics comprises search relevance metrics.

10. The tangible, non-transitory computer-readable storage medium of claim 7, comprising instructions to analyze the log data items and events to identify one or more dimensions of the events.

11. A system comprising:
a processor; and
a memory, the processor being configurable to:
obtain a plurality of log data items from a log data queue;
filter the plurality of log data items to obtain relevant log data items;
compare selected relevant log data items to one or more event definitions;
when a selected relevant log data item matches an event definition, store an event in an events table and one or more dimensions of the event in a dimensions table, wherein an event comprises at least a portion of a log data item matching an event definition;
aggregate a plurality of performance metric definitions into a single expression;
select a metric from the plurality of performance metrics definitions;
select a dimension for the metric;
collect events with an attribute matching the selected dimension;
generate a metric value for the selected metric using the collected events;
repeat the selecting the metric, selecting the dimension, collecting, and generating forall metrics from the plurality of performance metrics definitions;
aggregate the generated metric values according to a unit time hierarchy; and
change one or more operating characteristics based on the aggregated generated metric values.

12. The system of claim 11, wherein the events represent user interactions with a user interface of an application.

13. The system of claim 11, wherein the plurality of performance metrics comprises search relevance metrics.

14. The system of claim 11, comprising the events generator to analyze the log data items and events to identify one or more dimensions of the events.

\* \* \* \* \*